United States Patent [19]
Hitomi

[11] Patent Number: 5,431,354
[45] Date of Patent: Jul. 11, 1995

[54] SPINNING REEL HAVING AN OSCILLATING MECHANISM

[75] Inventor: Yasuhiro Hitomi, Hashimoto, Japan

[73] Assignee: Shimano Inc., Osaka, Japan

[21] Appl. No.: 940,841

[22] Filed: Sep. 4, 1992

[30] Foreign Application Priority Data

Sep. 10, 1991 [JP] Japan .................. 3-72632 U

[51] Int. Cl.$^6$ .............................................. A01K 89/00
[52] U.S. Cl. ................................... 242/241; 242/158.3
[58] Field of Search ................................ 242/158.3, 241

[56] References Cited

U.S. PATENT DOCUMENTS

| 4,512,531 | 4/1985 | Tunoda | 242/241 |
| 4,773,611 | 9/1988 | Kaneco | 242/241 |
| 5,232,181 | 8/1993 | Fujine | 242/241 |

FOREIGN PATENT DOCUMENTS

| 1078807 | 3/1960 | Germany | 242/241 |
| 1-168168 | 11/1989 | Japan . | |
| 2246059 | 1/1992 | United Kingdom | 242/241 |

Primary Examiner—Daniel P. Stodola
Assistant Examiner—Eileen A. Dunn
Attorney, Agent, or Firm—Dickstein, Shapiro & Morin

[57] ABSTRACT

A spinning reel has an oscillating mechanism including a screw shaft rotatable by drive from a handle, an insert piece engaged with a helical groove formed in the screw shaft, and a slider for transmitting a reciprocating motion of the insert piece to a spool shaft. The spool shaft includes a wall perpendicular to an axis of the spool shaft. The slider has a front surface for contacting the wall of the spool shaft. The spool shaft includes a screw engaged with a threaded bore of the slider to maintain the front surface of the slider in contact with the wall of the spool shaft.

8 Claims, 4 Drawing Sheets

SPINNING REEL HAVING AN OSCILLATING MECHANISM

BACKGROUND OF THE INVENTION

1. Field of the Invention

This invention relates to spinning reels, and more particularly to a spinning reel having an oscillating mechanism including a screw shaft rotatable by drive imparted from a handle, an insert piece meshed with a helical groove formed in the screw shaft, and a slider for transmitting reciprocating movement of the insert piece to a spool shaft when the screw shaft is rotated.

2. Description of the Related Art

A spinning reel as constructed above is disclosed in Japanese Utility Model Publication Kokai No. 1989-168168, for example. In this prior construction, the spool shaft and screw shaft extend parallel to each other, and the insert piece is mounted in the slider. A reciprocating force of the insert piece is transmitted to the spool shaft through the slider connected to the spool shaft, thereby to reciprocate the spool shaft back and forth. This prior construction utilizes the moving force of the insert piece engaged with the helical groove formed in the screw shaft, thereby to obtain a relatively strong force. The spool shaft extends through a bore formed in the slider, and these components are rigidly interconnected by screws acting radially of the spool shaft. When a strong force is applied axially of the spool shaft, such as when the angler attempts to land a fish that gives strong pulls, the screws are subjected to a strong sheafing force. As a result, the screws may be deformed, or may become loose, to produce chattering or twisting between the spool shaft and slider. Thus, there is room for improvement.

It will be noted that chattering occurring between the spool shaft and slider at a time of winding a fishing line causes the fishing line to be wound in wrong positions on a spool. Consequently, the fishing line wound on the spool forms an undulating surface which may be obstructive to smooth unwinding of the fishing line at a bait casting time.

SUMMARY OF THE INVENTION

An object of the present invention is to provide an improved spinning reel which maintains the spool shaft and slider rigidly interconnected with a high degree of precision even if the spool shaft is subjected to a strong force.

The above object is fulfilled, according to the present invention, by a spinning reel comprising an oscillating mechanism for transmitting a reciprocating force of an insert piece engaged with a helical groove of a screw shaft to a spool shaft through a slider as noted in the outset hereof, wherein the spool shaft includes a wall perpendicular to an axis of the spool shaft, the slider defines a contact surface whose position is determined through contact with the wall, and fixing means is provided for applying a pressing force in a direction in which the wall and the contact surface contact each other.

The present invention has the following functions and effects.

The above features may be arranged as shown in FIGS. 1 through 3. A slider 22 is stabilized with fixing means R applying a pressing force to maintain a contact surface 22S of the slider 22 in contact with a wall S formed on a spool shaft 11. When a strong external force is applied axially of the spool shaft 11, this external force is counteracted by the contact between the wall S and contact surface 22S or by contact between the fixing means R and slider 22. This construction is capable of resisting the external force better than the conventional construction in which a shearing force acts on screws or the like. Since the contact surface 22S of the slider 22 contacts the wall S formed on the spool shaft 11, the slider 22 is maintained in a predetermined position relative to the spool shaft 11.

According to the present invention, the spool shaft 11 includes the wall S perpendicular to the axis of the spool shaft 11, which is combined with the fixing means R having a relatively simple screw structure, to reliably fix the slider 11 to a predetermined position relative to the spool shaft 11.

Thus, the present invention provides an improved spinning reel which maintains the spool shaft and slider rigidly interconnected with a high degree of precision even if the spool shaft is subjected to a strong force.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Spinning reels embodying the present invention will be described in detail with reference to the drawings.

Figure 5:
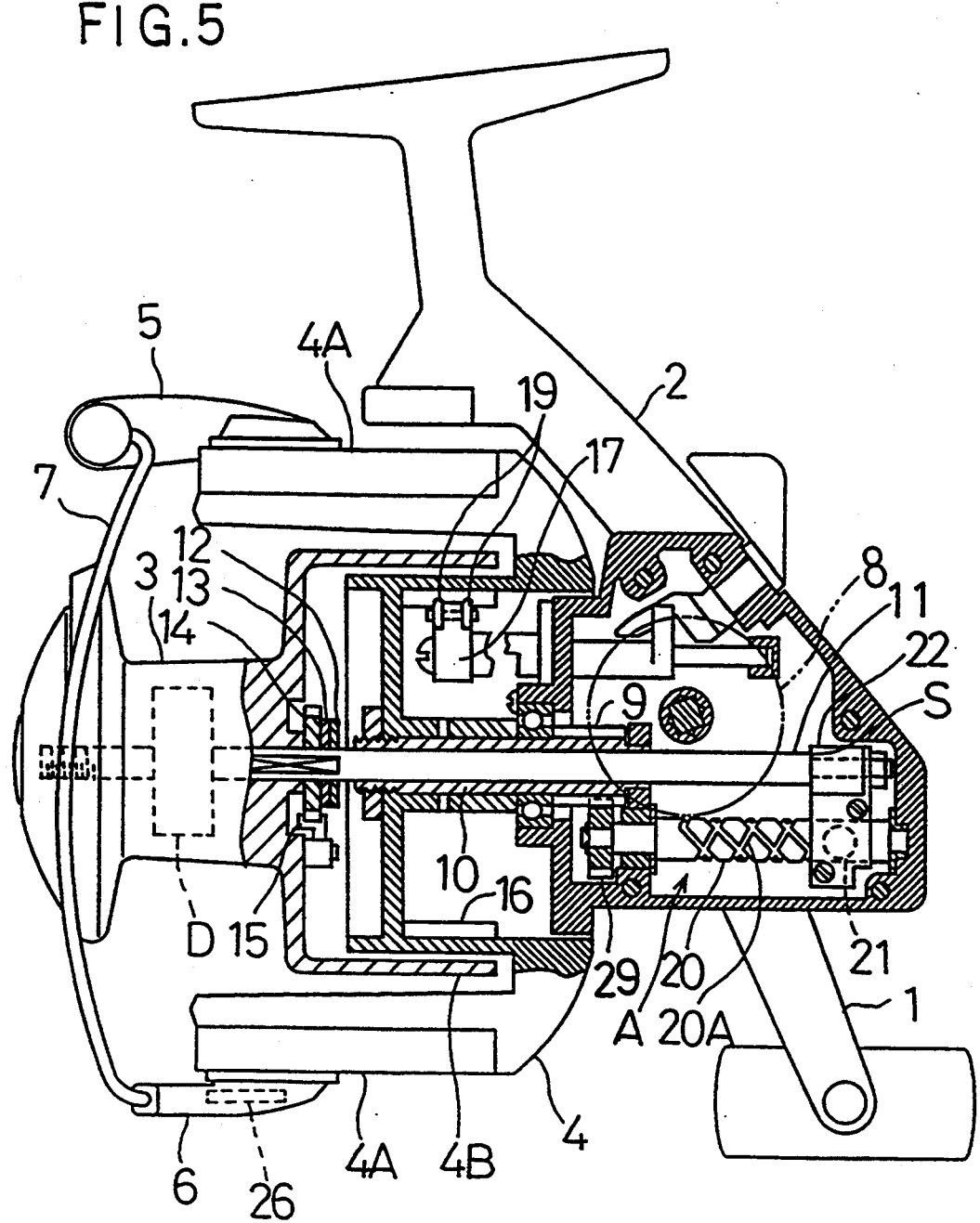
FIG. 5 is a side view in vertical section of a spinning reel.

As shown in FIG. 5, a spinning reel includes a handle 1 attached to a reel body 2, a spool 3 connected to a forward portion of the reel body 2 for winding a fishing line and a rotor 4 disposed forwardly of the reel body 2 to be rotatable by drive transmitted from the handle 1. The rotor 4 includes a pair of arms 4A having an arm cam 5, an oscillatable arm 6, and a bail 7 extending between the arm cam 5 and oscillatable arm 6.

The spinning reel further includes a drive system for transmitting a rotating force in a line winding direction of the handle 1 to the rotor 4 through a drive gear 8, a pinion gear 9 and a sleeve shaft 10. An oscillating mechanism A is provided to receive drive from the pinion gear 9 for reciprocating the spool 3 back and forth through a spool shaft 11.

Figure 4:
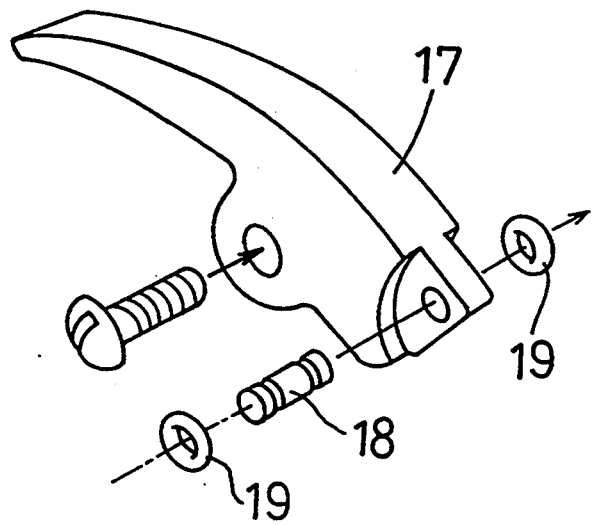
FIG. 4 is a perspective view of a stopper.

The spool 3 contains a drag mechanism D in a forward portion thereof. The spool shaft 11 has, arranged in the stated order on an inward portion thereof, an abutting member 12, a washer 13, and a gear-like sound producing member 14 acting also as a washer of the drag mechanism D. The spool 3 has a sound producing piece 15 for engaging teeth of the sound producing member 14. The rotor 4 contains a stopper 17 for engaging a plurality of teeth 16 formed on an inner peripheral wall of a drum portion 4B of the rotor 4, to prevent backward rotation of the rotor 4. As shown in FIG. 4, O-rings 19 are mounted on an axis 18 at an end of the stopper 17 to suppress a sound produced by contact between the teeth 16 and stopper 17.

The oscillating mechanism A includes a screw shaft 20 carrying an input gear 29 meshed with the pinion gear 9, an insert piece 21 engaged with a helical groove 20A formed in the screw shaft 20, and a slider 22 for transmitting a reciprocating force from the insert piece 21 to the spool shaft 11. The screw shaft 20 extends parallel to the spool shaft 11, and the insert piece 21 is mounted in the slider 22. The slider 22 is rigidly connected to the spool shaft 11 by the following structure.

Figure 1:
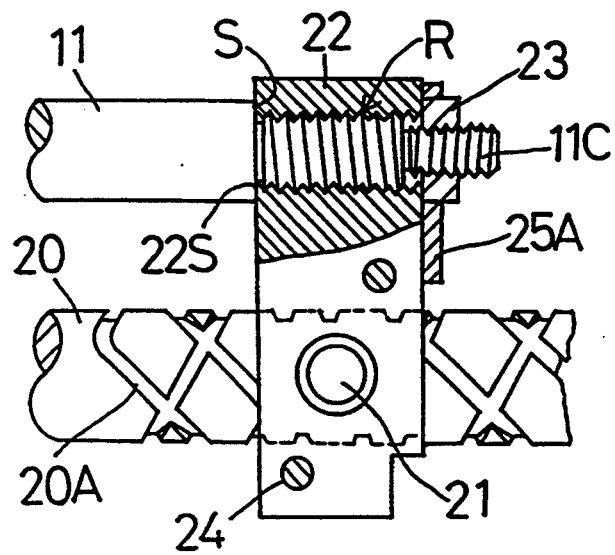
FIG. 1 is a side view, partly in section, of a slider.
Figure 2:
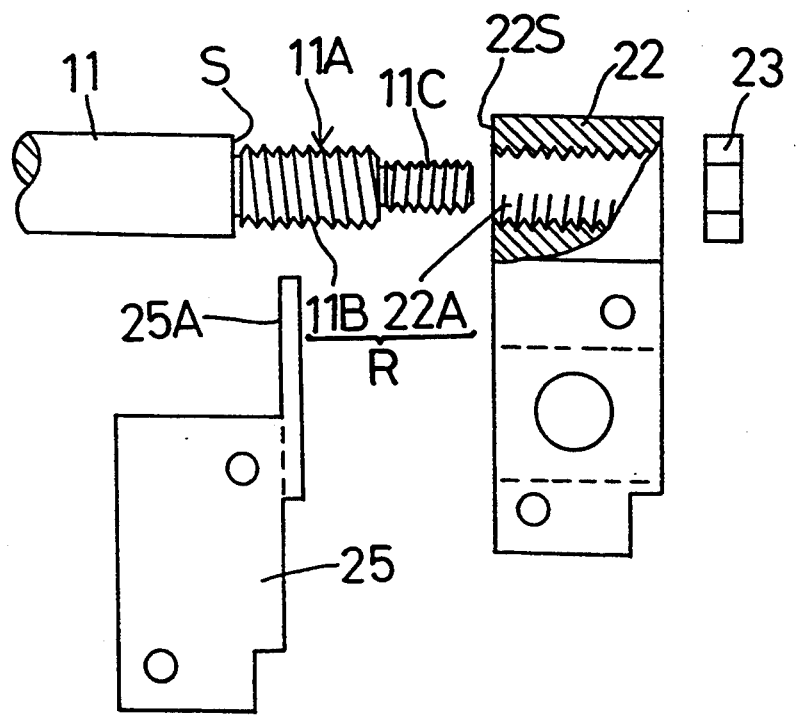
FIG. 2 is an exploded view showing a connecting structure of the slider.
Figure 3:
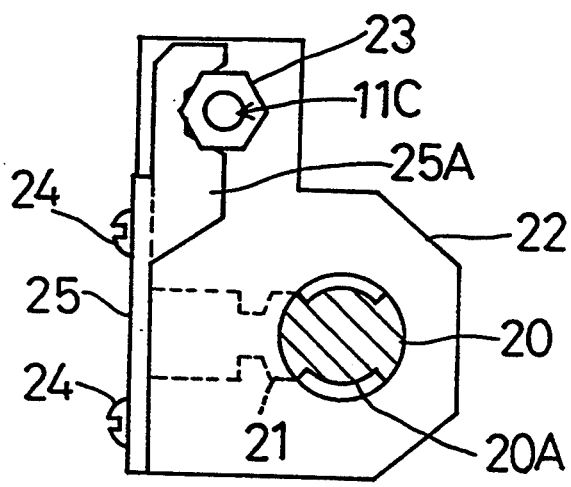
FIG. 3 is a rear view of the slider.

As shown in FIGS. 1 through 3, the spool shaft 11 defines a wall S which is perpendicular to an axis of the spool shaft 11. The spool shaft 11 includes a rear end region 11A having a reduced diameter rearwardly of the wall S. This rear end region 11A defines a right handed screw 11B. The screw 1 1B is meshed with a screw 22A in the slider 22, with a front surface 22S (an example of contact surfaces) of the slider 22 contacting the wall S. The spool shaft 11 further includes a left handed screw 11C at an end thereof. A nut 23 is meshed with the screw 11C and placed in contact with a rear surface of the slider 22. In this way the slider 22 is fixed to the spool shaft 11.

In this structure, the screw 11B of the spool shaft 11 and the screw 22A of the slider 22 constitute fixing means R. The nut 23 is locked against rotation by an engaging portion 25A of a retainer 25 fixed to the slider 22 by small screws 24.

The nut 23 meshed with the left handed screw 22C is used in order to preclude loosening of the connection between the spool shaft 11 and slider 22 even when a torque is applied to the spool shaft 11, such as when a strong tension is applied to the fishing line.

As shown in FIG. 5, the reel includes a balancer 26, such as a piece of lead, mounted in the oscillatable arm 6 to enable smooth rotation of the rotor 4.

Figure 6:
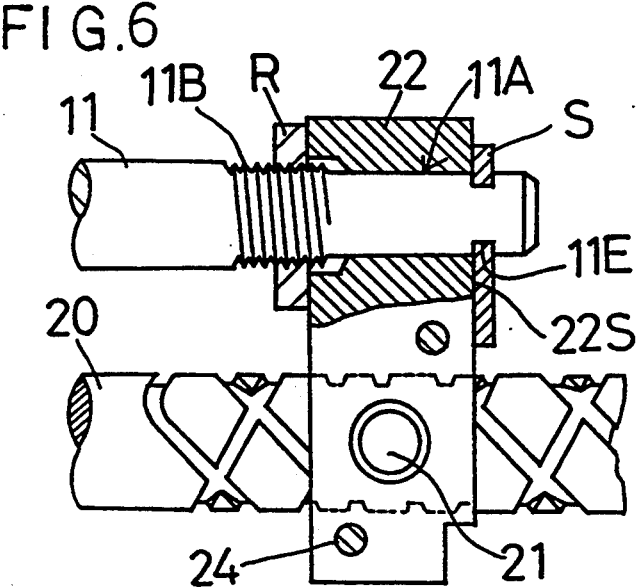
FIG. 6 is a side view, partly in section, of a different embodiment (a)
Figure 7:
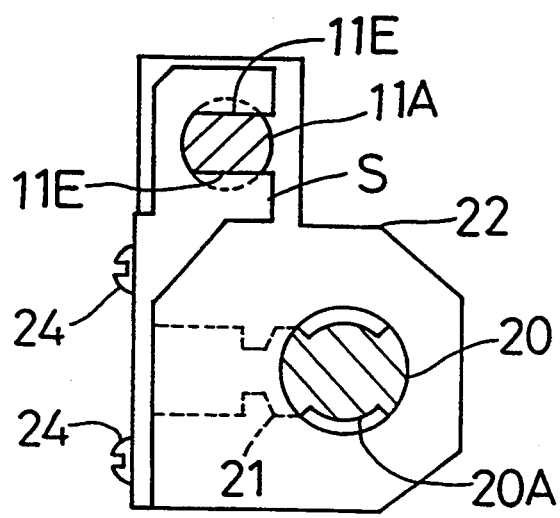
FIG. 7 is a rear view of the different embodiment (a)

The foregoing embodiment may be modified as follows: (a) As shown in FIGS. 6 and 7, the spool shaft 11 includes a screw 11B and a small diameter portion 11A in a rear end region thereof. The small diameter portion 11A defines a pair of grooves 11E. The slider 22 is mounted on the rear end region, with a plate member S (one example of wall means) fitted in the grooves 11E. The plate member S is in contact with a rear surface 22S (one example of contact surfaces) of the slider 22. A nut R (one example of fixing means) is meshed with the screw 11B and placed in contact with a front surface of the slider 22. Thus, the slider 22 is fixed to the spool shaft 11, with the plate member S fixed to the slider 22 by small screws 24.

Figure 8:
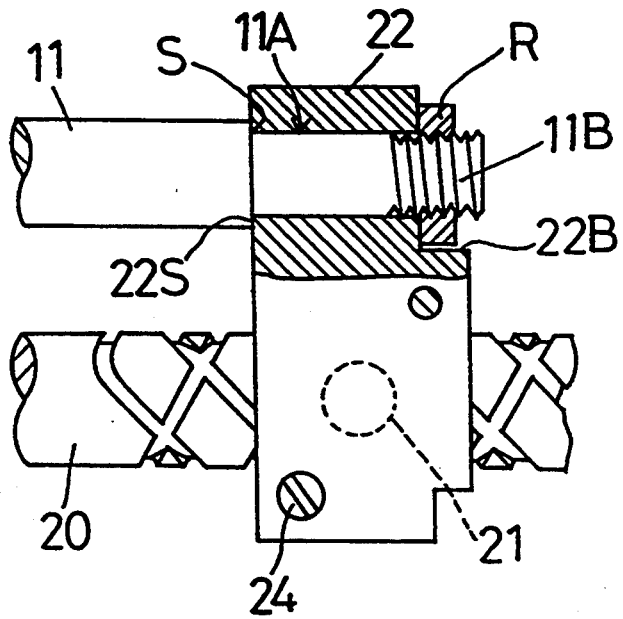
FIG. 8 is a side view, partly in section, of a different embodiment (b).

(b) As shown in FIG. 8, the spool shaft 11 includes a small diameter portion 11A and a screw 11B arranged in a rear end region thereof. The slider 22 defines a through hole for tight fitting with the small diameter portion 11A. A nut R is meshed with the screw 11B at the rear end of the spool shaft 11, and is placed in contact with a rotation stopper 22B formed on the slider 22. The spool shaft 11 and slider 22 are maintained in a predetermined relative position by contact between a wall S formed on the spool shaft 11 and a front surface 22S (one example of contact surfaces) of the slider 22, and by engagement between the small diameter portion 11A and the through hole of the slider 22, while the slider 22 locks the nut R against rotation.

What is claimed is:

1. A spinning reel comprising:
   a reel body;
   a handle rotatably supported on said reel body;
   a spool shaft supported on said reel body for reciprocating movement;
   a spool mounted on said spool shaft;
   a rotor supported on said reel body and rotatable in response to input operating force applied to said handle to wind a fishing line onto said spool;
   a drive mechanism for transmitting input operating force applied to said handle to said rotor; and
   an oscillating mechanism for reciprocating said spool shaft, said oscillating mechanism being mounted on said reel body, and said oscillating mechanism including:
   a screw shaft rotatable in response to input operating force applied to said handle and having a helical groove formed thereon;
   a transmission, coupled to said drive mechanism, for transmitting input operating force applied to said handle to said screw shaft;
   an insert piece engaged with said helical groove formed on said screw shaft;
   a slider for transmitting a reciprocating motion of said insert piece in association with rotation of said screw shaft to said spool shaft, wherein said slider is mounted on said screw shaft and maintains said insert piece engaged within said helical groove;
   said spool shaft including a wall surface substantially perpendicular to an axis of said spool shaft, said wall surface being defined at a rear end of said spool shaft;
   said slider defining a contact surface whose position is determined through contact with said wall surface;
   fixing means for maintaining said contact surface in contact with said wall surface;
   said fixing means including a screw portion of said spool shaft and a screw portion of said slider; and
   said spool shaft including a left handed screw formed on an end thereof and engaged with a nut placed in contact with a rear surface of said slider, thereby fixing said slider to said spool shaft.

2. A spinning reel as claimed in claim 1, further comprising:
   a retainer, having an engaging portion that locks said nut against rotation, said retainer being fixed to said slider by a fixing element.

3. A spinning reel comprising:
   a reel body;
   a handle rotatably supported on said reel body;
   a spool shaft supported on said reel body for reciprocating movement, said spool shaft having a wall surface substantially normal to an axis of said spool shaft;
   a spool mounted on said spool shaft;
   a rotor supported on said reel body, said rotor being rotatable in response to input operating force applied to said handle to wind a fishing line onto said spool;
   a drive mechanism for transmitting input operating force applied to said handle to said rotor; and
   an oscillating mechanism for reciprocating said spool shaft, said oscillating mechanism being mounted to said reel body, said oscillating mechanism including:

a screw shaft rotatable in response to an input operating force applied to said handle and having a helical groove thereon;

a transmission, coupled to said drive mechanism, for transmitting said input operating force applied to said handle to said screw shaft;

an insert piece engaged in said helical groove a slider for transmitting a reciprocating movement of said insert piece to said spool shaft, said slider being mounted said screw shaft and maintaining said insert piece engaged with said helical groove, said slider being rotatable relative to said screw shaft, and having a contact surface;

a fixing means displaceable along said axis of said spool shaft for maintaining said contact surface of said slider in a contacting condition with said wall surface by pressing said slider toward said wall surface; and wherein an angular position of said slider relative to said spool shaft is determined by a contact between said contact surface of said slider and said wall surface of said spool shaft.

4. A spinning reel as claimed in claim 3, wherein said spool shaft further includes at said wall surface a threaded projection having a smaller diameter than the spool shaft, and wherein said fixing means comprises a nut engageable with said threaded portion for pressing said slider towards said wall surface.

5. A spinning reel comprising:

a reel body;

a handle rotatably supported on said reel body;

a spool shaft reciprocatively supported on said reel body, said spool shaft having a wall surface substantially normal to an axis of said spool shaft;

a spool mounted on said spool shaft;

a rotor supported on said reel body and rotatable in response to input force operating on said handle to wind a fishing line onto said spool;

a drive mechanism for transmitting input operating force applied to said handle to said rotor;

an oscillating mechanism for reciprocating said spool shaft, said oscillating mechanism being mounted on said reel body, said oscillating mechanism including:

a screw shaft rotatable in response to input operating force applied to said handle and having a helical groove thereon;

a transmission, coupled to said drive mechanism, for transmitting input operating force applied to said handle to said screw shaft;

an insert piece engaged in said helical groove formed on said screw shaft;

a slider for transmitting a reciprocating movement of said insert piece in association with rotation of said screw shaft relative to said spool shaft, wherein said slider is mounted on said screw shaft and maintains said insert piece engaged in said helical groove, said slider being rotatable relative to said screw shaft, said slider defining first and second contact surfaces on a pair of opposite sides thereof and defining a through hole extending from said first contact surface to said second contact surface into which a portion of said spool shaft is inserted; and a fixing means displaceable along said axis of said spool shaft for maintaining said slider in contact with said spool shaft, said slider being positioned between said fixing means and said wall surface, wherein axial movement of said fixing means against said second contact surface causes said first contact surface of said slider to contact said wall surface of said spool shaft;

wherein an angular position of said slider relative to said spool shaft is determined by contact between said first contact surface and said wall surface.

6. A spinning reel as claimed in claim 5, wherein said wall surface of said spool shaft comprises a plate member fitted in grooves formed in a small diameter portion at an end of said spool shaft.

7. A spinning reel as claimed in claim 6, wherein said fixing means comprises a nut meshed with a screw formed on said spool shaft, said nut being placed in contact with said second contact surface of said slider, thereby fixing said slider to said spool shaft, said plate member being fixed to said slider by fixing elements.

8. A spinning reel as claimed in claim 5, wherein said spool shaft includes a small diameter portion and a screw in a rear end region thereof, and said slider defines a through hole for tight fitting with said small diameter portion, a nut being meshed with said screw in said rear end region of said spool shaft, and placed in contact with a rotation stopper formed on said slider.

* * * * *